(12) United States Patent
Kurokawa et al.

(10) Patent No.: US 11,754,904 B2
(45) Date of Patent: Sep. 12, 2023

(54) LIGHT CONTROL DEVICE AND ILLUMINATION DEVICE

(71) Applicant: Japan Display Inc., Tokyo (JP)

(72) Inventors: Tae Kurokawa, Tokyo (JP); Takeo Koito, Tokyo (JP); Masashi Mitsui, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/876,549

(22) Filed: Jul. 29, 2022

(65) Prior Publication Data

US 2022/0365402 A1 Nov. 17, 2022

Related U.S. Application Data

(63) Continuation of application No. PCT/JP2020/047429, filed on Dec. 18, 2020.

(30) Foreign Application Priority Data

Jan. 30, 2020 (JP) .................................. 2020-013971

(51) Int. Cl.
*G02F 1/29* (2006.01)
*G02F 1/137* (2006.01)
(Continued)

(52) U.S. Cl.
CPC ............ *G02F 1/29* (2013.01); *G02F 1/13471* (2013.01); *G02F 1/13712* (2021.01);
(Continued)

(58) Field of Classification Search
CPC ...... G02F 1/1347; G02F 1/13471; G02F 1/29; G02F 1/134309
See application file for complete search history.

(56) References Cited

U.S. PATENT DOCUMENTS 4,572,616 A * 2/1986 Kowel ................ G02F 1/13471
349/200
2010/0053539 A1* 3/2010 Lin .......................... G02F 1/29
349/200

(Continued)

FOREIGN PATENT DOCUMENTS

JP 2006-145707 A 6/2006
JP 2008-076926 A 4/2008
(Continued)

OTHER PUBLICATIONS

International Search Report and Written Opinion dated Mar. 9, 2021, received for PCT Application PCT/JP2020/047429, filed on Dec. 18, 2020, 8 pages including English Translation.

*Primary Examiner* — Jessica M Merlin
(74) *Attorney, Agent, or Firm* — XSENSUS LLP

(57) ABSTRACT

According to one embodiment, a light control device comprises a first liquid crystal cell includes a first liquid crystal layer, a second liquid crystal cell includes a second liquid crystal layer, and a third liquid crystal cell includes a third liquid crystal layer. The first liquid crystal layer and the third liquid crystal layer each have a first region that scatters a first polarization component and that transmits a second polarization component. The second liquid crystal layer has a third region that overlaps the first region and converts the second polarization component into the first polarization component.

19 Claims, 10 Drawing Sheets

(51) Int. Cl.
*G02F 1/1337* (2006.01)
*G02F 1/1343* (2006.01)
*G02F 1/1347* (2006.01)
*G02F 1/1335* (2006.01)

(52) U.S. Cl.
CPC .. *G02F 1/133528* (2013.01); *G02F 1/133738* (2021.01); *G02F 1/134309* (2013.01); *G02F 2201/122* (2013.01); *G02F 2203/01* (2013.01)

(56) References Cited

U.S. PATENT DOCUMENTS

| | | |
|---|---|---|
| 2012/0257131 A1 | 10/2012 | Galstian et al. |
| 2014/0028924 A1* | 1/2014 | Yamaguchi .......... G03B 17/565 349/1 |
| 2016/0077402 A1 | 3/2016 | Takehara et al. |

FOREIGN PATENT DOCUMENTS

| | | |
|---|---|---|
| JP | 2019-82502 A | 5/2019 |
| WO | 2015/093223 A1 | 6/2015 |

\* cited by examiner

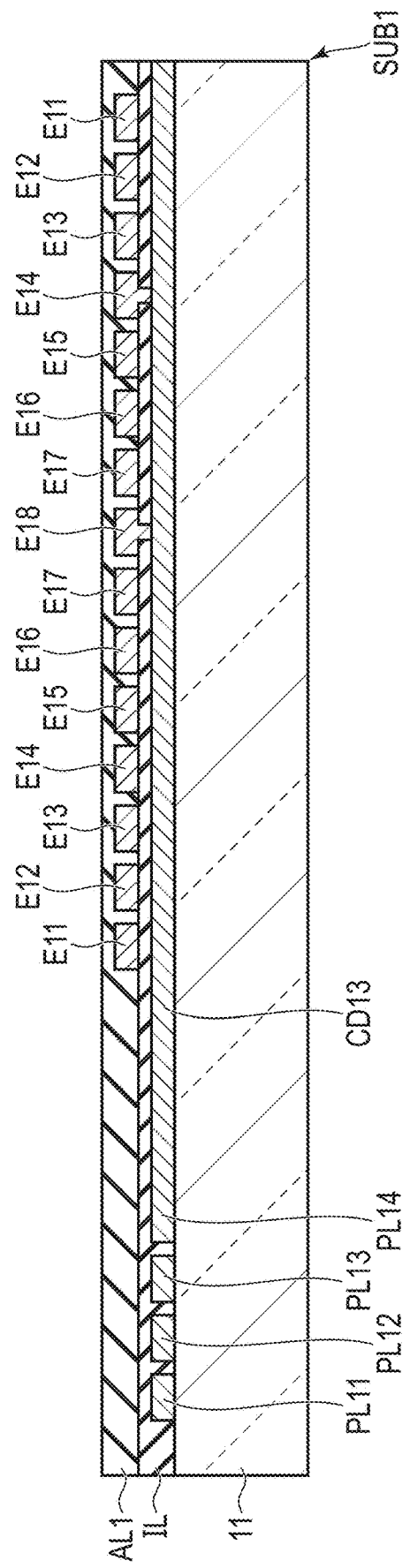
F I G. 4

LIGHT CONTROL DEVICE AND ILLUMINATION DEVICE

CROSS-REFERENCE TO RELATED APPLICATIONS

This application is a Continuation Application of PCT Application No. PCT/JP2020/047429, filed Dec. 18, 2020 and based upon and claiming the benefit of priority from Japanese Patent Application No. 2020-013971, filed Jan. 30, 2020, the entire contents of all of which are incorporated herein by reference.

FIELD

Embodiments described herein relate generally to a light control device and an illumination device.

BACKGROUND

In recent years, a light control device using a liquid crystal cell has been proposed. Such a light control device mainly converges or diverges a polarization component. For example, a liquid crystal lens comprising a plurality of ring electrodes has been proposed. In addition, a liquid crystal lens provided with transparent electrodes arranged in a plurality of fan-shaped divided areas has also been proposed as another example.

In an example of using a light control device using a liquid crystal cell, efficiently scattering incident light is required.

BRIEF DESCRIPTION OF THE DRAWINGS

FIG. 4 is a cross-sectional view showing the first substrate SUB1 shown in FIG. 3 along the conductive line CD13.

DETAILED DESCRIPTION

Figure 1:
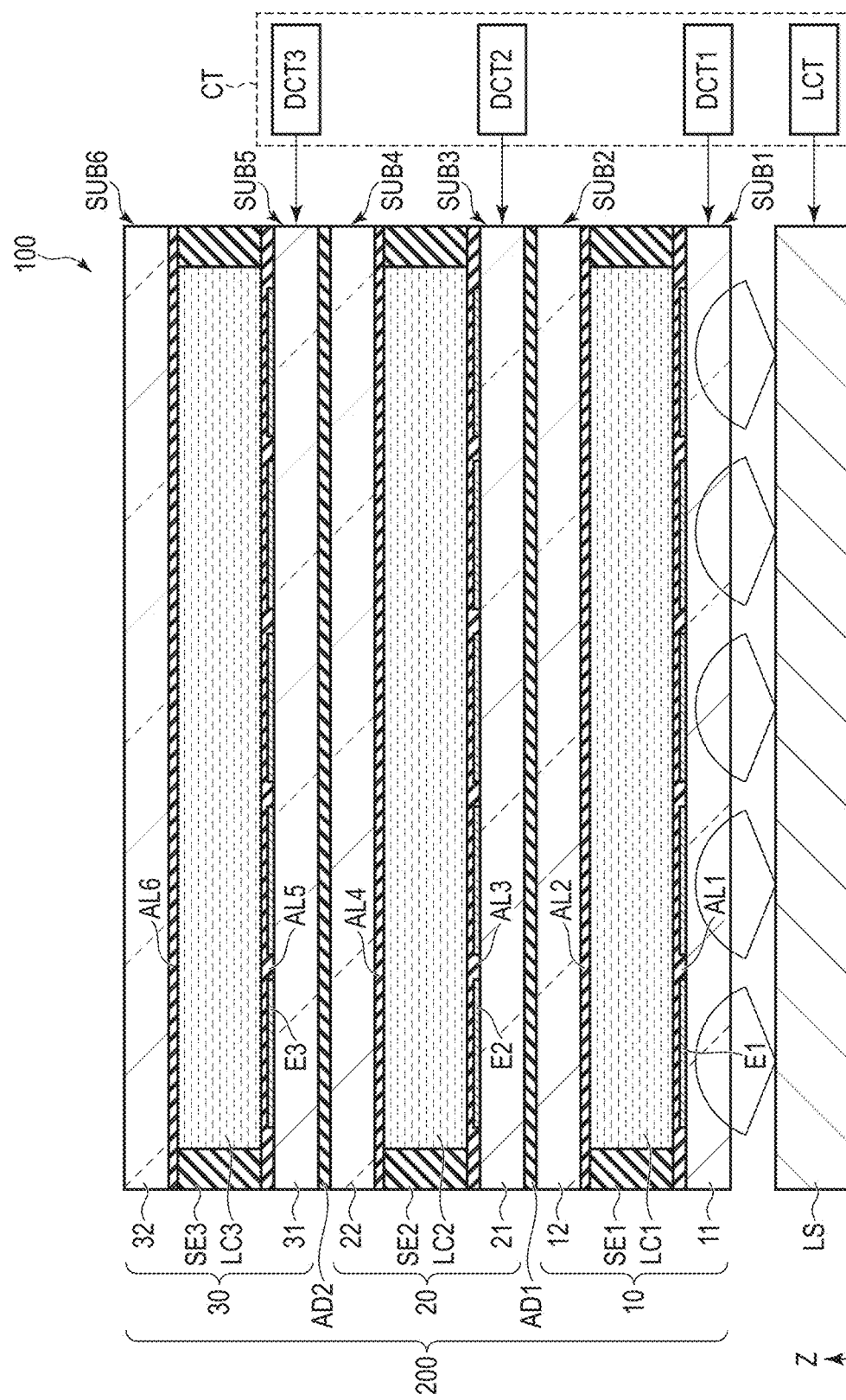
FIG. 1 is a view showing a configuration example of an illumination device 100 of embodiments.

In general, according to one embodiment, a light control device comprises: a first liquid crystal cell comprising a first substrate, a second substrate opposed to the first substrate, and a first liquid crystal layer held between the first substrate and the second substrate, the first substrate comprising a plurality of first electrodes disposed concentrically; a second liquid crystal cell comprising a third substrate, a fourth substrate opposed to the third substrate, and a second liquid crystal layer held between the third substrate and the fourth substrate, the third substrate comprising a plurality of second electrodes disposed concentrically and overlapping the second substrate; and a third liquid crystal cell comprising a fifth substrate, a sixth substrate opposed to the fifth substrate, and a third liquid crystal layer held between the fifth substrate and the sixth substrate, the fifth substrate comprising a plurality of third electrodes disposed concentrically and overlapping the fourth substrate. Each of the first liquid crystal layer and the third liquid crystal layer includes: a first area where a first polarization component having a first polarization plane along a first direction, of incident light, is scattered and a second polarization component having a second polarization plane along a second direction intersecting the first direction, of the incident light, is transmitted; and a second area where the first polarization component of the incident light is converted into the second polarization component, and the second polarization component of the incident light is scattered. The second liquid crystal layer includes: a third area which overlaps the first area and where the second polarization component of the incident light is converted into the first polarization component; and a fourth area which overlaps the second area.

According to another embodiment, a light control device comprises: a first liquid crystal cell comprising a first substrate, a second substrate opposed to the first substrate, and a first liquid crystal layer held between the first substrate and the second substrate, the first substrate comprising a plurality of first electrodes disposed concentrically; a second liquid crystal cell comprising a third substrate, a fourth substrate opposed to the third substrate, and a second liquid crystal layer held between the third substrate and the fourth substrate, the third substrate comprising a plurality of second electrodes disposed concentrically and overlapping the second substrate; and a third liquid crystal cell comprising a fifth substrate, a sixth substrate opposed to the fifth substrate, and a third liquid crystal layer held between the fifth substrate and the sixth substrate, the fifth substrate comprising a plurality of third electrodes disposed concentrically and overlapping the fourth substrate. Each of the first liquid crystal layer and the third liquid crystal layer has a positive dielectric anisotropy and contains liquid crystal molecules twist-aligned in a state in which a voltage is not applied. The second liquid crystal layer has a negative dielectric anisotropy and contains liquid crystal molecules homogeneously aligned in a state in which a voltage is not applied.

According to yet another embodiment, a light control device comprises: a first liquid crystal cell comprising a first substrate, a second substrate opposed to the first substrate, and a first liquid crystal layer held between the first substrate and the second substrate, the first substrate comprising a plurality of first electrodes disposed concentrically; a second liquid crystal cell comprising a third substrate, a fourth substrate opposed to the third substrate, and a second liquid crystal layer held between the third substrate and the fourth substrate, the third substrate comprising a plurality of second electrodes disposed concentrically and overlapping the second substrate; and a third liquid crystal cell comprising a fifth substrate, a sixth substrate opposed to the fifth substrate, and a third liquid crystal layer held between the fifth substrate and the sixth substrate, the fifth substrate comprising a plurality of third electrodes disposed concentrically and overlapping the fourth substrate. Each of the first liquid crystal layer and the third liquid crystal layer has a positive dielectric anisotropy and contains liquid crystal molecules twist-aligned in a state in which a voltage is not applied. The second liquid crystal layer has a negative dielectric anisotropy and contains liquid crystal molecules twist-aligned in a state in which a voltage is not applied.

According to yet another embodiment, a light control device comprises: a first liquid crystal cell comprising a first substrate, a second substrate opposed to the first substrate, and a first liquid crystal layer held between the first substrate and the second substrate, the first substrate comprising a plurality of first electrodes disposed concentrically; a second liquid crystal cell comprising a third substrate, a fourth substrate opposed to the third substrate, and a second liquid crystal layer held between the third substrate and the fourth substrate, the third substrate comprising a plurality of second electrodes disposed concentrically and overlapping the second substrate; and a third liquid crystal cell comprising a fifth substrate, a sixth substrate opposed to the fifth substrate, and a third liquid crystal layer held between the fifth substrate and the sixth substrate, the fifth substrate comprising a plurality of third electrodes disposed concentrically and overlaps the fourth substrate. Each of the first liquid crystal layer and the third liquid crystal layer has a positive dielectric anisotropy and contains liquid crystal molecules twist-aligned in a state in which a voltage is not applied. The second liquid crystal layer has a positive dielectric anisotropy and containing liquid crystal molecules homogeneously aligned in a state in which a voltage is not applied.

According to yet another embodiment, a light control device comprises: a first liquid crystal cell comprising a first substrate, a second substrate opposed to the first substrate, and a first liquid crystal layer held between the first substrate and the second substrate, the first substrate comprising a plurality of first electrodes disposed concentrically; a second liquid crystal cell comprising a third substrate, a fourth substrate opposed to the third substrate, and a second liquid crystal layer held between the third substrate and the fourth substrate, the third substrate comprising a plurality of second electrodes disposed concentrically and overlapping the second substrate; and a third liquid crystal cell comprising a fifth substrate, a sixth substrate opposed to the fifth substrate, and a third liquid crystal layer held between the fifth substrate and the sixth substrate, the fifth substrate comprising a plurality of third electrodes disposed concentrically and overlapping the fourth substrate. Each of the first liquid crystal layer and the third liquid crystal layer has a positive dielectric anisotropy and contains liquid crystal molecules twist-aligned in a state in which a voltage is not applied. The second liquid crystal layer has a positive dielectric anisotropy and contains liquid crystal molecules twist-aligned in a state in which a voltage is not applied.

According to one embodiment, an illumination device comprises: a light source; and one of the above light control devices configured to control light emitted from the light source.

According to the embodiments, a light control device and an illumination device capable of improving a scattering efficiency can be provided.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a view showing a configuration example of an illumination device 100 of the embodiments. For example, a first direction X, a second direction Y, and a third direction Z are orthogonal to each other but may intersect at an angle other than 90 degrees. The first direction X and the second direction Y correspond to, for example, directions parallel to a substrate included in the illumination device 100, and the third direction Z corresponds to a thickness direction of the illumination device 100. In the embodiments, viewing an X-Y plane defined by the first direction X and the second direction Y is referred to as planar view.

The illumination device 100 comprises a light source LS, a light control device 200 configured to control light emitted from the light source LS, and a controller CT. The light source LS emits light in the third direction Z. The light emitted from the light source LS is, for example, non-polarized light (natural light). The light control device 200 overlaps the light source LS in the third direction Z. The light control device 200 comprises a first liquid crystal cell 10, a second liquid crystal cell 20, and a third liquid crystal cell 30. The first liquid crystal cell 10 and the third liquid crystal cell 30 include substantially the same components, but may include different components.

The first liquid crystal cell 10 comprises a first substrate SUB1, a second substrate SUB2, and a first liquid crystal layer LC1. The first substrate SUB1 comprises an insulating substrate 11, a plurality of first electrodes E1 disposed on the insulating substrate 11, and a first alignment film AL1 covering the first electrodes E1. The light source LS is disposed to be opposed to the insulating substrate 11 in the third direction Z. The second substrate SUB2 comprises an insulating substrate 12 and a second alignment film AL2. The second substrate SUB2 may comprise a common electrode opposed to the plurality of first electrodes E1 via the first liquid crystal layer LC1. The first liquid crystal layer LC1 is held between the fifth substrate SUB1 and the second substrate SUB2 and is in contact with the first alignment film AL1 and the second alignment film AL2. The first liquid crystal layer LC1 is sealed by a sealant SE1.

The second liquid crystal cell 20 comprises a third substrate SUB3 overlapping the second substrate SUB2, a fourth substrate SUB4, and a second liquid crystal layer LC2. The third substrate SUB3 comprises an insulating substrate 21, a plurality of second electrodes E2 disposed on the insulating substrate 21, and a third alignment film AL3 covering the second electrodes E2. The second electrodes E2 are formed to overlap the first electrodes E1 in the third direction Z. The fourth substrate SUB4 comprises an insulating substrate 22 and a fourth alignment film AL4. The second liquid crystal layer LC2 is held between the third substrate SUB3 and the fourth substrate SUB4 and is in contact with the third alignment film AL3 and the fourth alignment film AL4. The second liquid crystal layer LC2 is sealed by a sealant SE2. In the second liquid crystal cell 20, the third substrate SUB3 includes substantially the same components as those of the first substrate SUB1, and the fourth substrate SUB4 includes substantially the same components as those of the second substrate SUB2. However, the configuration of the second liquid crystal layer LC2 is different from the configuration of the first liquid crystal layer LC1. In addition, the alignment treatment of the third alignment film AL3 and the fourth alignment film AL4 may be different from the alignment treatment of the first alignment film AL1 and the second alignment film AL2.

The third liquid crystal cell 30 comprises a fifth substrate SUB5 overlapping the fourth substrate SUB4, a sixth substrate SUB6, and a third liquid crystal layer LC3. The fifth substrate SUB5 comprises an insulating substrate 31, a plurality of third electrodes E3 disposed on the insulating substrate 31, and a fifth alignment film AL5 covering the third electrodes E3. The third electrodes E3 are formed to overlap the first electrodes E1 and the second electrodes E2 in the third direction Z. The sixth substrate SUB6 comprises an insulating substrate 32 and a sixth alignment film AL6. The sixth substrate SUB6 may comprise a common electrode opposed to the plurality of third electrodes E3 via the third liquid crystal layer LC3. The third liquid crystal layer LC3 is held between the fifth substrate SUB5 and the sixth substrate SUB6 and is in contact with the fifth alignment film AL5 and the sixth alignment film AL6. The third liquid crystal layer LC3 is sealed by a sealant SE3. In the third liquid crystal cell 30, the fifth substrate SUB5 includes the same components as those of the first substrate SUB1, the sixth substrate SUB6 includes the same components as those of the second substrate SUB2, and the configuration of the third liquid crystal layer LC3 is the same as the configuration of the first liquid crystal layer LC1.

The insulating substrates 11 and 12, the insulating substrates 21 and 22, and the insulating substrates 31 and 32 are, for example, transparent substrates such as glass substrates and resin substrates.

The first electrodes E1, the second electrodes E2, and the third electrodes E3 are transparent electrodes formed of a transparent conductive material such as indium tin oxide (ITO) or indium zinc oxide (IZO).

The first alignment film AL1, the second alignment film AL2, the third alignment film AL3, the fourth alignment film AL4, the fifth alignment film AL5, and the sixth alignment film AL6 are horizontal alignment films having an alignment restriction force substantially parallel to the X-Y plane and are subjected to alignment treatment in a predetermined direction. The alignment treatment may be a rubbing treatment or an optical alignment treatment.

The second liquid crystal cell 20 overlaps the first liquid crystal cell 10 in the third direction Z. The insulating substrate 12 and the insulating substrate 21 are bonded to each other by a transparent adhesive layer AD1. A refractive index of the adhesive layer AD1 is equal to the refractive index of the insulating substrates 12 and 21.

The third liquid crystal cell 30 overlaps the second liquid crystal cell 20 in the third direction Z. The insulating substrate 22 and the insulating substrate 31 are bonded to each other by a transparent adhesive layer AD2. A refractive index of the adhesive layer AD2 is equal to the refractive index of the insulating substrates 22 and 31.

The controller CT comprises a light source controller LCT and voltage controllers DCT1 to DCT3. The light source controller LCT controls, for example, a current value for driving the light source LS. The voltage controller DCT1 controls a voltage to be applied to each of the first electrodes E1 in the first liquid crystal cell 10. The voltage controller DCT2 controls a voltage to be applied to each of the second electrodes E2 in the second liquid crystal cell 20. The voltage controller DCT3 controls a voltage to be applied to each of the third electrodes E3 in the third liquid crystal cell 30.

Figure 2:
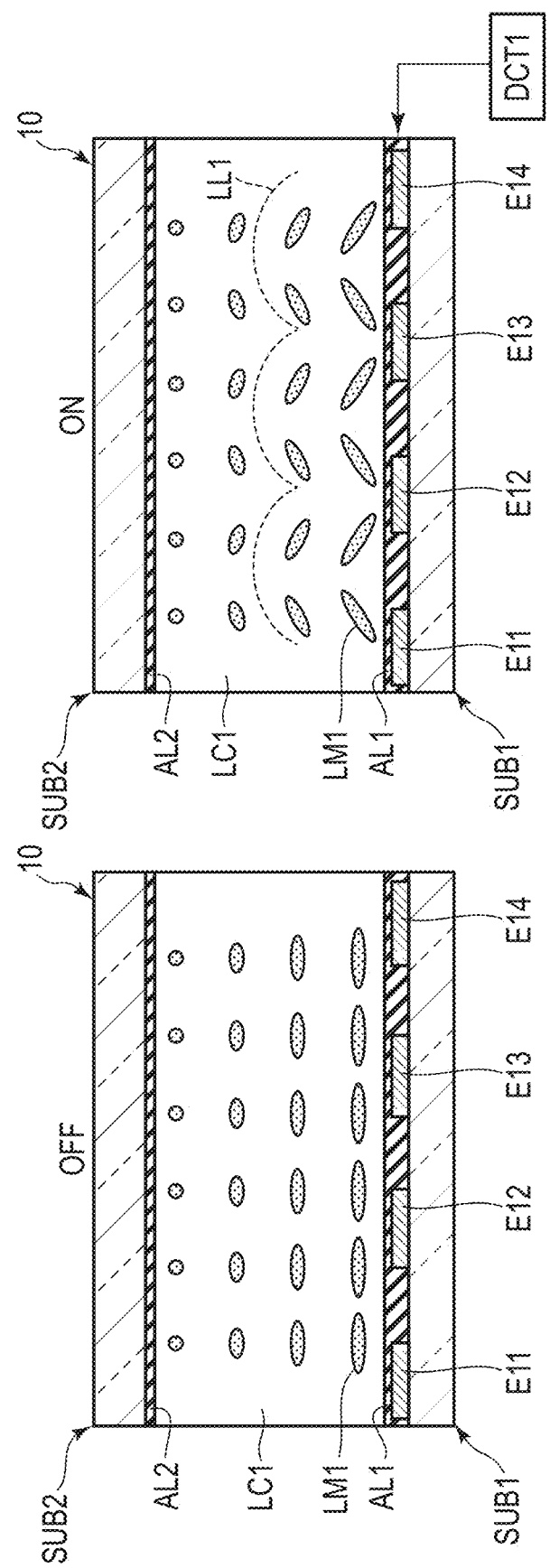
FIG. 2A is a view illustrating a lens action of a first liquid crystal cell 10 shown in FIG. 1.
FIG. 2B is a view illustrating a lens action of the first liquid crystal cell 10 shown in FIG. 1.

FIG. 2 is a view illustrating a lens action of the first liquid crystal cell 10 shown in FIG. 1. Only the configuration necessary for description is illustrated in FIG. 2. A liquid crystal lens LL1 formed in the first liquid crystal layer LC1 when the first liquid crystal cell 10 is a twist nematic liquid crystal element will be described.

The liquid crystal lens LL1 described here corresponds to a refractive index distribution type lens formed in the first liquid crystal layer LC1. The first liquid crystal cell 10 in which the liquid crystal lens LL1 is formed generates a lens action of scattering the incident light by refracting (converging and diverging) the incident light. The degree of scattering (modulation rate) is controlled by the voltage applied to the first liquid crystal layer LC1. In other words, the modulation rate in the first liquid crystal cell 10 is controlled by the voltage controller DCT1.

Although the description is omitted, a liquid crystal lens similar to the liquid crystal lens LL1 described with reference to FIG. 2 can be formed in the third liquid crystal cell 30 too. The modulation rate in the third liquid crystal cell 30 is controlled by the voltage controller DCT3. The voltage controller DCT1 and the voltage controller DCT3 may be controlled under the same voltage conditions or may be controlled under different voltage conditions.

FIG. 2A shows an off state (OFF) in which no voltage is applied to the first electrodes E11 to E14. In other words, no potential difference is formed between the adjacent first electrodes. Liquid crystal molecules LM1 contained in the first liquid crystal layer LC1 is twist-aligned due to the alignment restriction force of the first alignment film AL1 and the second alignment film AL2.

FIG. 2B shows an on state (ON) in which a voltage is applied to the first electrodes E11 to E14. The voltage controller DCT1 supplies a predetermined voltage to each of the first electrodes E11 to E14 such that a potential difference is formed between the adjacent first electrodes. An electric field is formed along the main surface (X-Y plane) of the first substrate SUB1 between the first electrodes E11 and E12, between the first electrodes E12 and E13, and between the first electrodes E13 and E14. The first liquid crystal layer LC1 has, for example, a positive dielectric anisotropy. For this reason, the liquid crystal molecules LM1 are aligned such that their long axes are aligned along the electric field in a state where the electric field is formed. The first liquid crystal layer LC1 has a thickness of several tens of μm to several hundreds of μm and, when a voltage is applied to the first electrodes E11 to E14, an electric field is formed in the vicinity of the first substrate SUB1 but an electric field hardly reaches the vicinity of the second substrate SUB2. For this reason, the liquid crystal molecules LM1 located in the vicinity of the first substrate SUB1 are aligned under the influence of the electric field, but the liquid crystal molecules LM1 located in the vicinity of the second substrate SUB2 are maintained in the aligned state similar to the OFF state.

The liquid crystal molecules LM1 have a refractive anisotropy Δn. For this reason, the first liquid crystal layer LC1 has a refractive index distribution according to the aligned state of the liquid crystal molecules LM1. Alternatively, the first liquid crystal layer LC1 has a retardation distribution represented by Δn·d where d refers to a thickness of the first liquid crystal layer LC1 along the third direction Z. The liquid crystal lens LL1 represented by a dotted line in the figure is formed by such a refractive index distribution or a retardation distribution.

In FIG. 2A, an example in which the liquid crystal molecules LM1 in the OFF state are twist-aligned has been described, but the embodiments are not limited to this and the liquid crystal molecules LM1 in the OFF state may be horizontally aligned or vertically aligned. In either of the cases, the incident light is scattered by forming a refractive index distribution in which the liquid crystal molecules LM1 in the ON state form the lens action.

Figure 3:
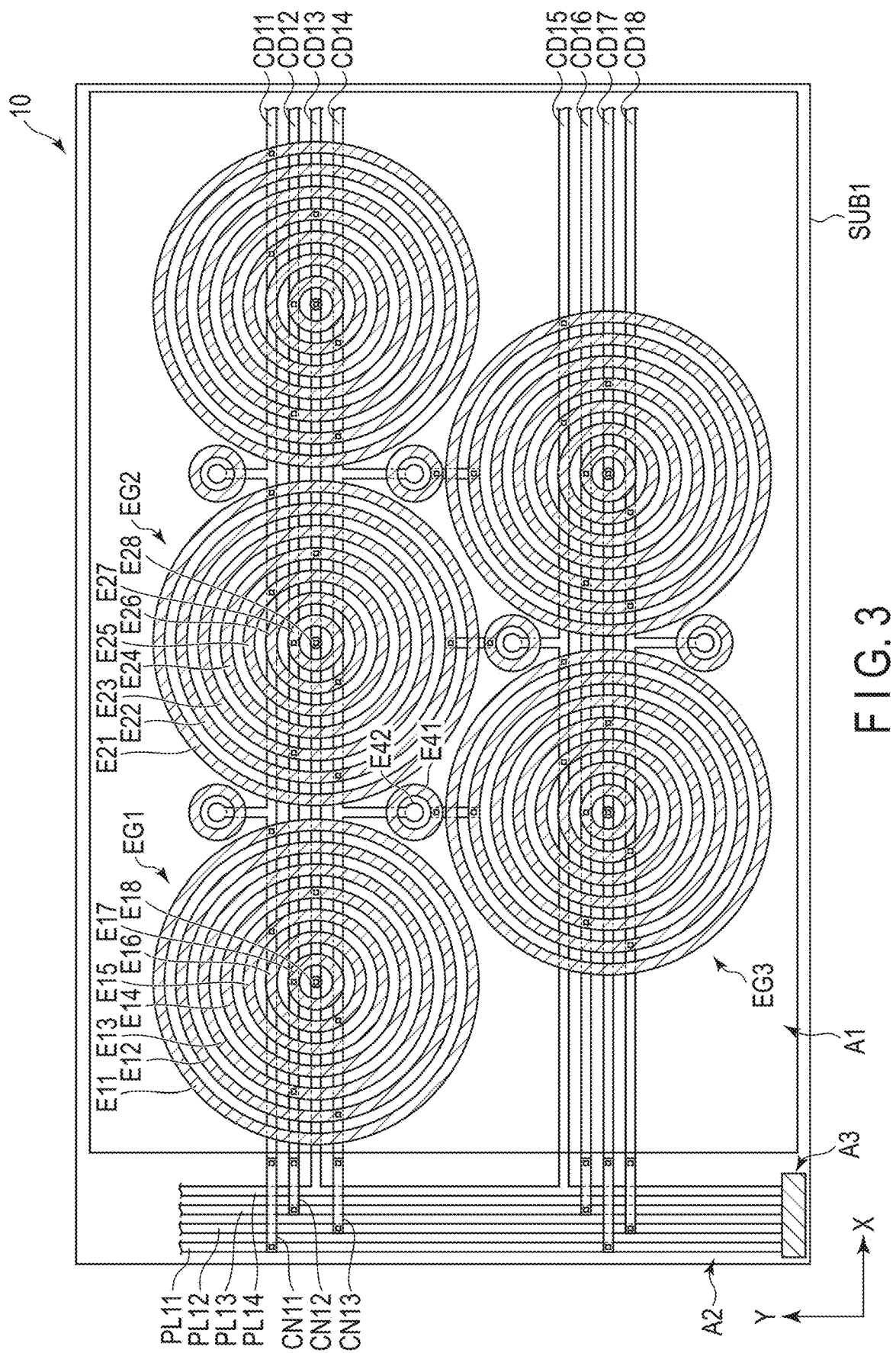
FIG. 3 is a plan view showing a configuration example of the first liquid crystal cell 10.

FIG. 3 is a plan view showing a configuration example of the first liquid crystal cell 10. Only main parts of the first liquid crystal cell 10 are illustrated in FIG. 3.

The first substrate SUB1 of the first liquid crystal cell 10 comprises a plurality of power supply lines PL11 to PL14, a plurality of conductive lines CD11 to CD18, and a plurality of electrode groups EG1 to EG3. The power supply lines PL11 to PL14 and the conductive lines CD11 to CD18 are disposed in the same layer. An insulating film to be described later is interposed between the conductive lines CD11 to CD18 and the electrode groups EG1 to EG3. In FIG. 3, squares at positions where the two conductive layers overlap indicate connection portions which the conductive layer located under the insulating film and the conductive layer located above the insulating film are electrically connected to each other through contact holes penetrating the insulating film.

The power supply lines PL11 to PL14 are arranged in the first direction X in a peripheral area A2. Each of these power supply lines PL11 to PL14 extends to a terminal portion A3. Although not described in detail, the terminal portion A3 comprises a plurality of terminals connected to the respective power supply lines PL11 to PL14, and is electrically connected to a flexible printed circuit board or the like.

The conductive lines CD11 to CD18 extend along the first direction X and are arranged in the second direction Y, in an effective area A1. In addition, the conductive lines CD11 to CD18 extend to the peripheral area A2 and are electrically connected to any of the power supply lines PL11 to PL14. For example, the conductive line CD13 is formed integrally with the power supply line PL14. In addition, the conductive line CD11 is electrically connected to the power supply line PL11 via the connection line CN11. Similarly, the conductive line CD12 is connected to the power supply line PL13 via the connecting line CN12, and the conductive line CD14 is connected to the power supply line PL12 via the connection line CN13. These connection lines CN11 to CN13 are conductive layers disposed in the same layer as the electrode groups EG1 to EG3.

Each of the electrode groups EG1 to EG3 is composed of a plurality of first electrodes E1 formed concentrically. For example, the electrode group EG1 is composed of eight first electrodes E11 to E18. All the first electrodes E11 to E11 are formed in an annular shape and have the same width. In addition, the first electrode E18 located substantially at the center of the electrode group EG1 is formed in a circular shape. The first electrodes E11 to E11 are arranged toward the first electrode E18 at substantially equal pitches in the radial direction.

The conductive lines CD11 to CD14 intersect the first electrodes E11 to E18. The first electrodes E11 and E15 are electrically connected to the conductive line CD11. The first electrodes E12 and E16 are electrically connected to the conductive line CD14. The first electrodes E13 and E11 are electrically connected to the conductive line CD12. The first electrodes E14 and E18 are electrically connected to the conductive line CD13.

The electrode groups EG2 and EG3 are configured similarly to the electrode group EG1.

The number of first electrodes constituting each electrode group is not limited to the illustrated example.

These electrode groups EG1 to EG3 are disposed to form a close-packed structure in the X-Y plane.

The electrode E41 is located on an inner side surrounded by the electrode groups EG1 to EG3. In other words, the electrode E41 is disposed in a gap between the electrode groups EG1 to EG3 disposed to form the close-packed structure. The electrode E41 is formed in an annular shape smaller than that of the first electrode E11. A potential of the electrode E41 is set to be different from the potential of the adjacent electrodes.

The electrode E42 is located inside the electrode E41 and is electrically connected to the conductive line CD14. A potential of the electrode E42 is set to be different from the potential of the electrode E41.

FIG. 4 is a cross-sectional view showing the first substrate SUB1 shown in FIG. 3 along the conductive line CD13. The power supply lines PL11 to PL14 and the conductive line CD13 are disposed on the insulating substrate 11 and covered with the insulating film IL. The first electrodes E11 to E18 are disposed on the insulating film IL and covered with the first alignment film AL1. The first electrode E18 may be disposed between the insulating substrate 11 and the insulating film IL and, in this case, the first electrode E18 may be formed integrally with the conductive line CD13. In the illustrated example, the conductive line CD13 is directly connected to the power supply line PL14. In addition, the first electrodes E14 and E18 are connected to the conductive line CD13 through contact holes penetrating the insulating film IL.

The power supply lines PL11 to PL14 are formed of, for example, a metal material. As described above, the first electrodes E11 to E18 are formed of a transparent conductive material. The conductive line CD13 is formed of, for example, a transparent conductive material, but may be formed of a metal material.

The configuration example of the first liquid crystal cell 10 has been described with reference to FIG. 3 and FIG. 4, and the third substrate SUB3 of the second liquid crystal cell 20 and the fifth substrate SUB5 of the third liquid crystal cell 30 are also constituted similarly to the first substrate SUB1.

Figure 5:
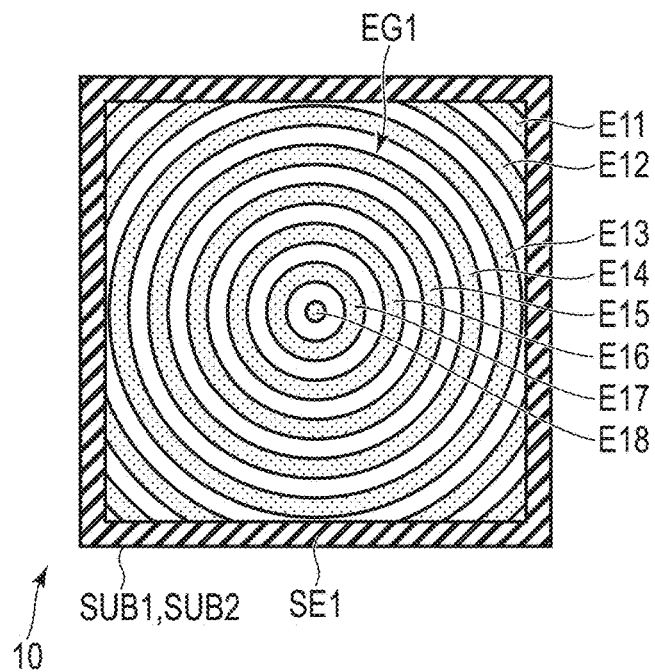
FIG. 5 is a plan view showing another configuration example of the first liquid crystal cell 10.

FIG. 5 is a plan view showing another configuration example of the first liquid crystal cell 10. The configuration example shown in FIG. 5 is different from the configuration example shown in FIG. 3 in that the first substrate SUB1 having a rectangular shape comprises one electrode group EG1. The first substrate SUB1 and the second substrate SUB2 are bonded to each other by a rectangular sealant SE1. The first substrate SUB1 comprises a plurality of first electrodes E11 to E18 constituting the electrode group EG1. In the illustrated example, the first electrodes E11 and E12 located near corners of the first substrate SUB1 are formed in an arc shape, the first electrodes E13 to E17 are formed in an annular shape, and the first electrode E18 is formed in a circular shape.

Figure 6:
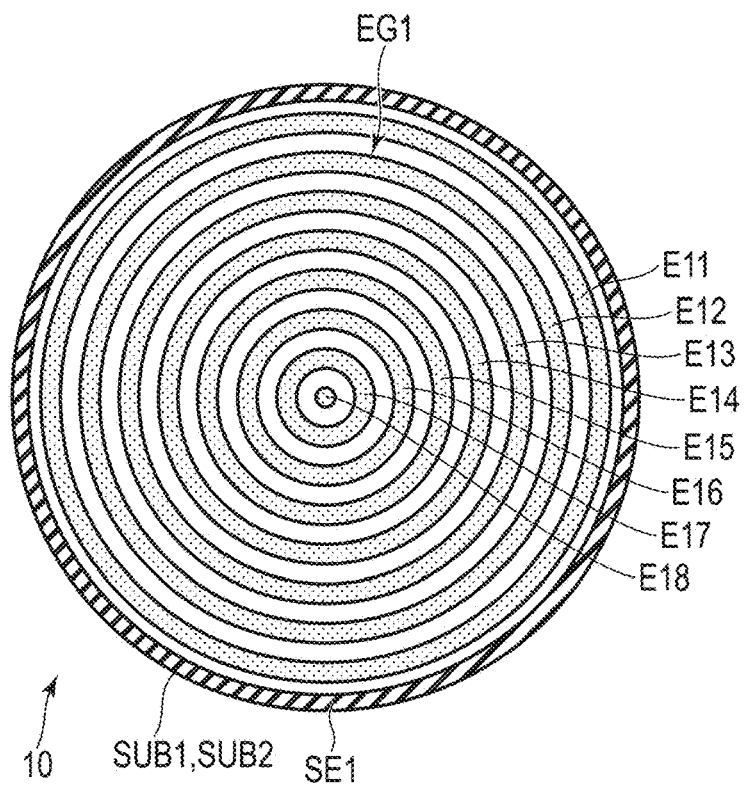
FIG. 6 is a plan view showing the other configuration example of the first liquid crystal cell 10.

FIG. 6 is a plan view showing the other configuration example of the first liquid crystal cell 10. The configuration example shown in FIG. 6 is different from the configuration example shown in FIG. 3 in that the first substrate SUB1 having a circular shape comprises one electrode group EG1. The first substrate SUB1 comprises a plurality of first electrodes E11 to E18 constituting the electrode group EG1. In the illustrated example, the first electrodes E11 to E17 are formed in an annular shape, and the first electrode E18 is formed in a circular shape.

Figure 7:
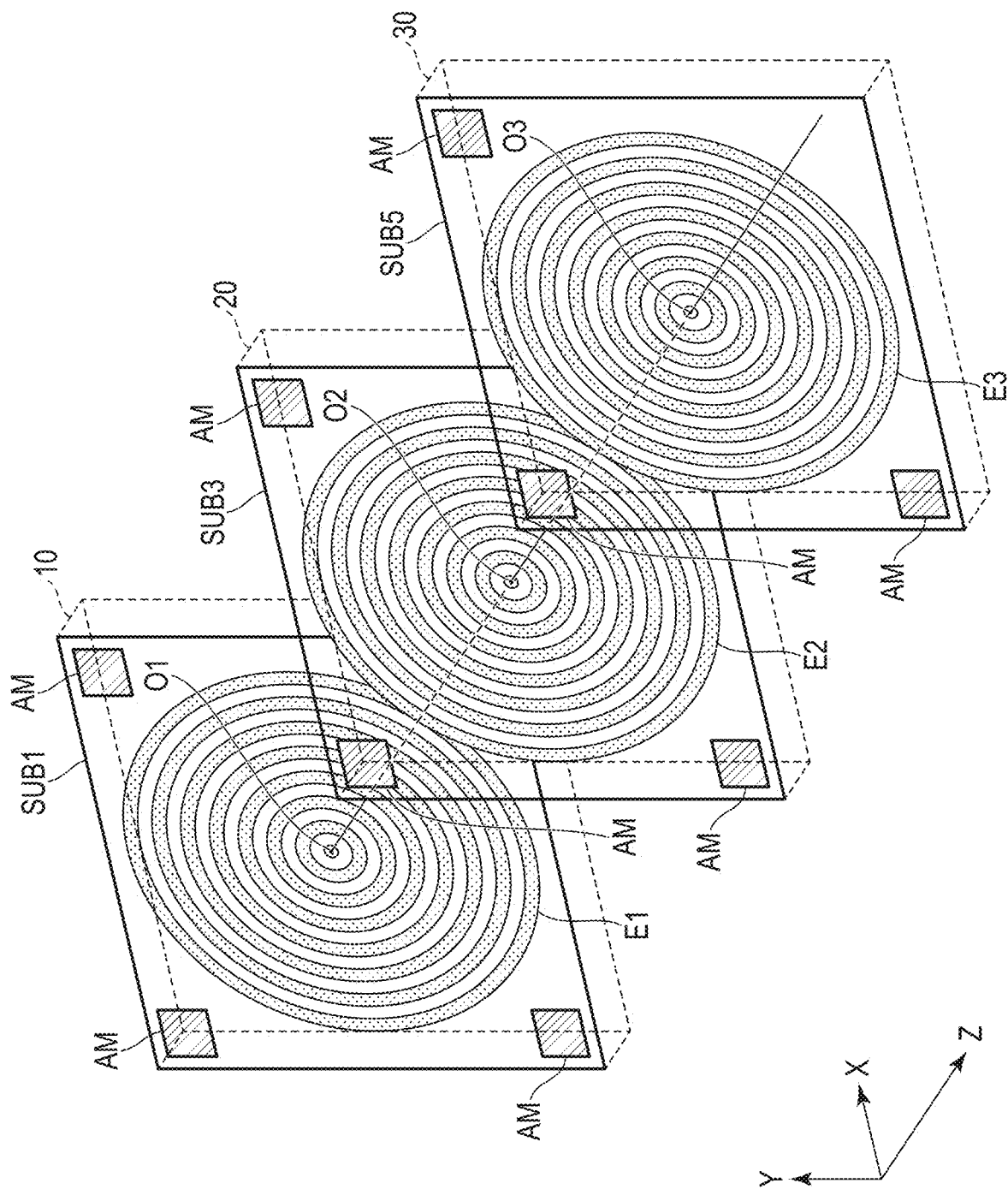
FIG. 7 is an exploded perspective view showing an overlapping state of first to third liquid crystal cells.

FIG. 7 is an exploded perspective view showing an overlapping state of first to third liquid crystal cells. In FIG. 7, only main parts are illustrated.

The first liquid crystal cell 10 comprises a plurality of first electrodes E1 disposed concentrically, the second liquid crystal cell 20 comprises a plurality of second electrodes E2 disposed concentrically, and the third liquid crystal cell 30 comprises a plurality of third electrodes E3 disposed concentrically. For example, each of the first electrode E1, the second electrode E2, and the third electrode E3 is equal in the diameter, the width, the pitch, and the number of electrodes. In addition, a center O1 of the first electrode E1, a center O2 of the second electrode E2, and a center O3 of the third electrode E3 overlap in planar view of the X-Y plane. In other words, the first electrode E1, the second electrode E2, and the third electrode E3 are formed such that their centers coincide with each other in the X-Y plane.

The first substrate SUB1 comprising the first electrodes E1, the third substrate SUB3 comprising the second electrodes E2, and the fifth substrate SUB5 comprising the third electrodes E3 are, for example, cut out from the same mother substrate and are formed under the same specifications. Each of these first substrate SUB1, the third substrate SUB3, and the fifth substrate SUB5 comprises an alignment mark AM. The first substrate SUB1 and the third substrate SUB3 are positioned based on their respective alignment marks AM and are disposed such that the first electrode E1 and the second electrode E2 overlap. The third substrate SUB3 and the fifth substrate SUB5 are positioned based on their respective alignment marks AM and are disposed such that the second electrode E2 and the third electrode E3 overlap.

First Configuration Example

Figure 8:
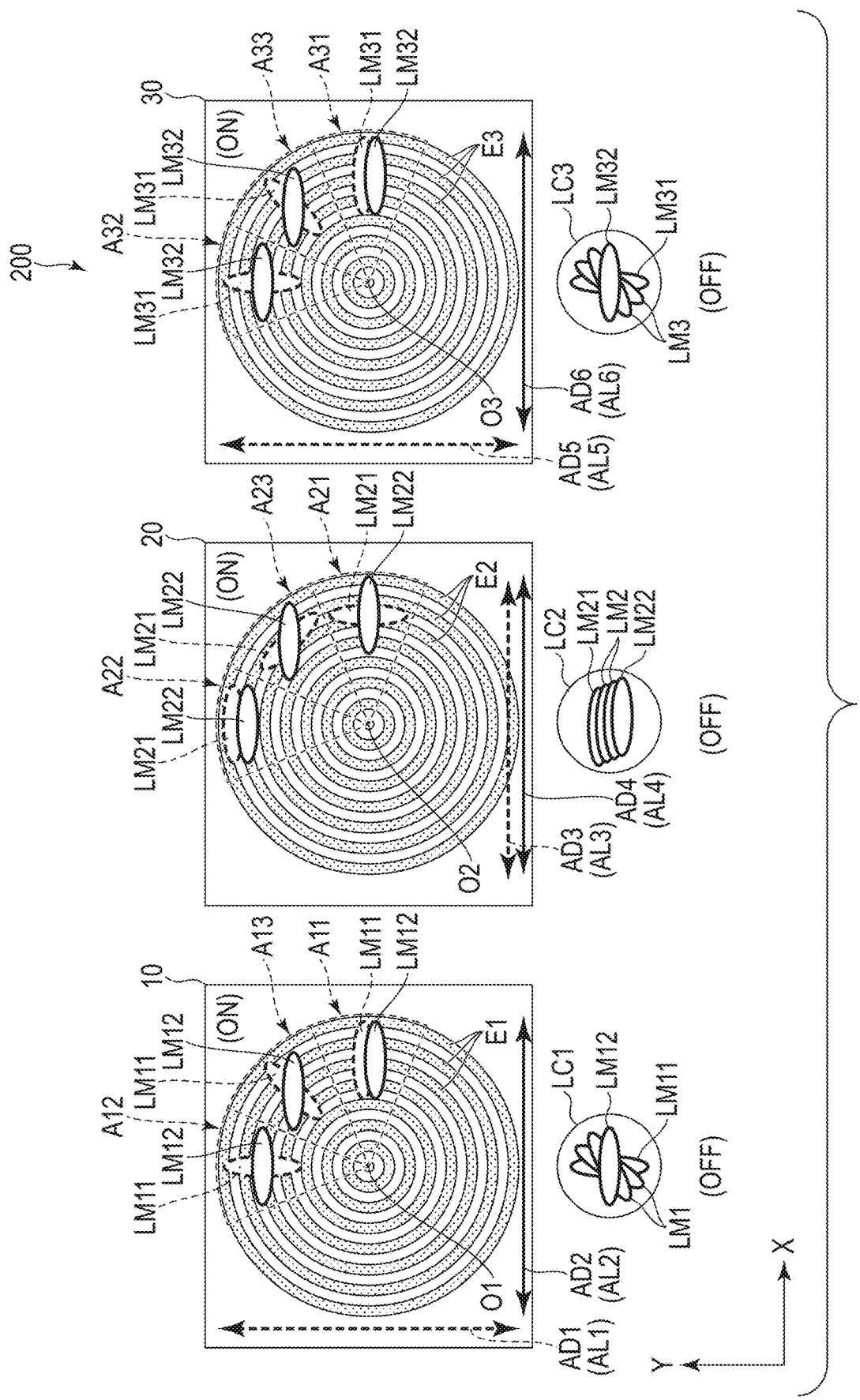
FIG. 8 is a view showing a first configuration example of a light control device 200.

FIG. 8 is a view showing a first configuration example of a light control device 200. FIG. 8 shows an aligned state of the liquid crystal molecules in the on state (ON) in which a voltage is applied to each of the first liquid crystal cell 10, the second liquid crystal cell 20, and the third liquid crystal cell 30, and shows an aligned state of the liquid crystal molecules in the off state (OFF) in which no voltage is applied to a lower stage of each of the liquid crystal cells.

In the first liquid crystal cell 10, an alignment treatment direction AD1 of the first alignment film AL1 is parallel to the second direction Y, and an alignment treatment direction AD2 of the second alignment film AL2 is parallel to the first direction X. In other words, the alignment treatment direction AD1 is orthogonal to the alignment treatment direction AD2 in the first liquid crystal cell 10. The first liquid crystal layer LC1 is a positive type with a positive dielectric anisotropy and contains liquid crystal molecules LM1. In the OFF state, the liquid crystal molecules LM1 are twist-aligned at 90 degrees between the first alignment film AL1 and the second alignment film AL2. Among the liquid crystal molecules LM1, a liquid crystal molecule LM11 near the first alignment film AL1 is aligned along the second direction Y, a liquid crystal molecule LM12 near the second alignment film AL2 is aligned along the first direction X, and the plurality of liquid crystal molecules LM1 located in the intermediate layer are twist-aligned.

In the second liquid crystal cell 20, an alignment treatment direction AD3 of the third alignment film AL3 and an alignment treatment direction AD4 of the fourth alignment film AL4 are parallel to the first direction X. In other words, the alignment treatment direction AD3 is parallel to the alignment treatment direction AD4 in the second liquid crystal cell 20. The second liquid crystal layer LC2 is a negative type with a negative dielectric anisotropy and contains liquid crystal molecules LM2. In the OFF state, the liquid crystal molecules LM2 are homogeneously aligned (horizontally aligned) between the third alignment film AL3 and the fourth alignment film AL4. In other words, the liquid crystal molecules LM2 are initially aligned along the first direction X. Among the liquid crystal molecules LM2, the liquid crystal molecule LM21 near the third alignment film AL3, the liquid crystal molecule LM22 near the fourth alignment film AL4, and the plurality of liquid crystal molecules LM2 located in the intermediate layer are all aligned in the first direction X.

In the third liquid crystal cell 30, an alignment treatment direction AD5 of the fifth alignment film AL5 is parallel to the second direction Y, and an alignment treatment direction AD6 of the sixth alignment film AL6 is parallel to the first direction X. In other words, the alignment treatment direction AD5 is orthogonal to the alignment treatment direction AD6, in the third liquid crystal cell 30. The third liquid crystal layer LC3 is a positive type with a positive dielectric anisotropy and contains liquid crystal molecules LM3. In the OFF state, the liquid crystal molecules LM3 are twist-aligned at 90 degrees between the fifth alignment film AL5 and the sixth alignment film AL6. Among the liquid crystal molecules LM3, a liquid crystal molecule LM31 near the fifth alignment film AL5 is aligned along the second direction Y, a liquid crystal molecule LM32 near the sixth alignment film AL6 is aligned along the first direction X, and the plurality of liquid crystal molecules LM3 located in the intermediate layer are twist-aligned.

The first liquid crystal cell 10 and the third liquid crystal cell 30 include substantially the same components as described above, and have the same optical rotation ability. In the embodiments, both the first liquid crystal cell 10 and the third liquid crystal cell 30 have an optical rotation ability to rotate a polarization plane of a polarization component (linearly polarized light) of the incident light at 90 degrees. For example, each of the first liquid crystal cell 10 and the third liquid crystal cell 30 converts a first polarization component of the incident light into a second polarization component. The polarization plane of the first polarization component is orthogonal to the polarization plane of the second polarization component. When a traveling direction of light is along the third direction Z, the polarization component having the polarization plane along the first direction X is referred to as first polarized light (P-polarized light) POL1, and the polarization component having the polarization plane along the second direction Y is referred to as second polarized light (S-polarized light) POL2. For example, the first polarization component is the first polarized light POL1, and the second polarization component is the second polarized light POL2.

The optical action of each liquid crystal cell will be described below.

The first liquid crystal cell 10 includes an area (first area) A11 extending from the center O1 of the first electrode E1 in the first direction X, an area (second area) A12 extending from the center O1 in the second direction Y, and an area A13 between the areas A11 and A12. In each of the areas A11 to A13, the liquid crystal molecules LM1 in the OFF state are also all twist-aligned similarly.

The liquid crystal molecule LM11 in the ON state is represented by a dotted line in the figure, and the liquid crystal molecule LM12 in the ON state is represented by a solid line in the figure. In addition, in the ON state, an electric field between adjacent first electrodes E1 is formed along the radial direction of the first electrodes E1, in each of the areas A11 to A13.

In the area A11, the liquid crystal molecule LM11 is aligned in the first direction X along the electric field. The liquid crystal molecules LM11 and LM12 are aligned substantially in parallel in planar view. In addition, in the area A11, the lens action occurs due to the refractive index distribution formed by the electric field. In such an area A11, the first polarization component (P-polarized light) of the incident light is scattered by the lens action. In addition, in the area A11, the second polarization component (S-polarized light) of the incident light is transmitted.

In the area A12, the liquid crystal molecule LM11 is aligned in the second direction Y along the electric field. The liquid crystal molecules LM11 and LM12 are aligned to be substantially orthogonal to each other in planar view. In addition, in the area A12, the lens action occurs due to the refractive index distribution formed by the electric field. In such an area A12, the first polarization component of the incident light is transmitted, and is converted into the second polarization component by rotating its polarization plane at 90 degrees. In addition, in the area A12, the second polarization component of the incident light is scattered by the lens action, and is converted into the first polarization component by rotating its polarization plane at 90 degrees.

In the area A13, the intermediate aligned state between the area A11 and the area A12 is formed. In other words, the liquid crystal molecules LM11 and LM12 are aligned to intersect but are not orthogonal to each other, in planar view. In addition, in the area A13, an intermediate lens action between the area A11 and the area A12 occurs due to the refractive index distribution formed by the electric field.

The second liquid crystal cell 20 includes an area (third area) A21 extending from the center O2 of the second electrode E2 in the first direction X, an area (fourth area) A22 extending from the center O2 in the second direction Y, and an area A23 between the areas A21 and A22. The area A21 overlaps the area A11, the area A22 overlaps the area A12, and the area A23 overlaps the area A13. In other words, the transmitted light of the area A11 becomes the incident light to the area A21, the transmitted light of the area A12 becomes the incident light to the area A22, and the transmitted light of the area A13 becomes the incident light to the area A23.

In each of the areas A21 to A23, the liquid crystal molecules LM2 in the OFF state are all homogeneously aligned similarly.

The liquid crystal molecule LM21 in the ON state is represented by a dotted line in the figure, and the liquid crystal molecule LM22 in the ON state is represented by a solid line in the figure. In addition, in the ON state, an electric field between adjacent second electrodes E2 is formed along the radial direction of the second electrodes E2, in each of the areas A21 to A23.

In the area A21, since the liquid crystal molecule LM21 is a negative type, it is aligned in the second direction Y to intersect the electric field. The liquid crystal molecules LM21 and LM22 are aligned to be substantially orthogonal to each other in planar view. In such an area A21, the second polarization component of the incident light which is the transmitted light of the area A11 is transmitted, and is converted into the first polarization component by rotating its polarization plane at 90 degrees. In addition, in the area A21, the first polarization component scattered in the area A11 is converted into the second polarization component.

In the area A22, the liquid crystal molecule LM21 is aligned in the first direction X to intersect the electric field. The liquid crystal molecules LM21 and LM22 are aligned substantially in parallel in planar view. In such an area A22, the first polarization component and the second polarization component of the incident light which is the transmitted light of the area A12, are transmitted.

In the area A23, an intermediate aligned state between the area A21 and the area A22 is formed. In other words, the liquid crystal molecules LM21 and LM22 are aligned to intersect but are not orthogonal to each other, in planar view.

The third liquid crystal cell 30 includes an area A31 extending from the center O3 of the third electrode E3 in the first direction X, an area A32 extending from the center O3 in the second direction Y, and an area A33 between the areas A31 and A32. The area A31 overlaps the area A21, the area A32 overlaps the area A22, and the area A33 overlaps the area A23. In other words, the transmitted light of the area A21 becomes the incident light to the area A31, the transmitted light of the area A22 becomes the incident light to the area A32, and the transmitted light of the area A23 becomes the incident light to the area A33.

In each of the areas A31 to A33, the liquid crystal molecules LM3 in the OFF state are all twist-aligned in the same manner.

The liquid crystal molecule LM31 in the ON state is represented by a dotted line in the figure, and the liquid crystal molecule LM32 in the ON state is represented by a solid line in the figure. In addition, in the ON state, an electric field between adjacent third electrodes E3 is formed along the radial direction of the third electrodes E3, in each of the areas A31 to A33.

In the area A31, the liquid crystal molecule LM31 is aligned in the first direction X along the electric field. The liquid crystal molecules LM31 and LM32 are aligned substantially in parallel in planar view. In addition, in the area A31, the lens action occurs due to the refractive index distribution formed by the electric field. In such an area A31, the first polarization component of the incident light which is the transmitted light of the area A21, is scattered by the lens action. In addition, in the area A31, the second polarization component of the incident light is transmitted.

In the area A32, the liquid crystal molecule LM31 is aligned in the second direction Y along the electric field. The liquid crystal molecules LM31 and LM32 are aligned to be substantially orthogonal to each other in planar view. In addition, in the area A32, the lens action occurs due to the refractive index distribution formed by the electric field. In such an area A32, the first polarization component of the incident light which is the transmitted light of the area A22, is transmitted and converted into the second polarization component. In addition, in the area A32, the second polarization component of the incident light is scattered by the lens action, and converted into the first polarization component.

In the area A33, the intermediate aligned state between the area A31 and the area A32 is formed. In other words, the liquid crystal molecules LM31 and LM32 are aligned to intersect but are not orthogonal to each other, in planar view. In addition, in the area A33, an intermediate lens action between the area A31 and the area A32 occurs due to the refractive index distribution formed by the electric field.

As described above, according to the first configuration example, the first polarization component of the incident light to the area A11 is scattered, but the second polarization component is hardly scattered. The second polarization component transmitted through the area A11 is converted into the first polarization component in the area A21, which is then scattered in the area A31. Therefore, both the first polarization component and the second polarization component of the light transmitted through the area A11, the area A21, and the area A31 of the light control device 200 are scattered.

In addition, the second polarization component of the incident light to the area A12 is scattered, but the first polarization component is converted into the second polarization component. The converted second polarization component is transmitted through the area A22 and then scattered in the area A32. Therefore, both the first polarization component and the second polarization component of the light transmitted through the area A12, the area A22, and the area A32 of the light control device 200 are scattered. Furthermore, both the first polarization component and the second polarization component of the light transmitted through the area A13, the area A23, and the area A33 of the light control device 200 are also scattered in the same manner.

The scattering efficiency can be thereby improved.

Second Configuration Example

Figure 9:
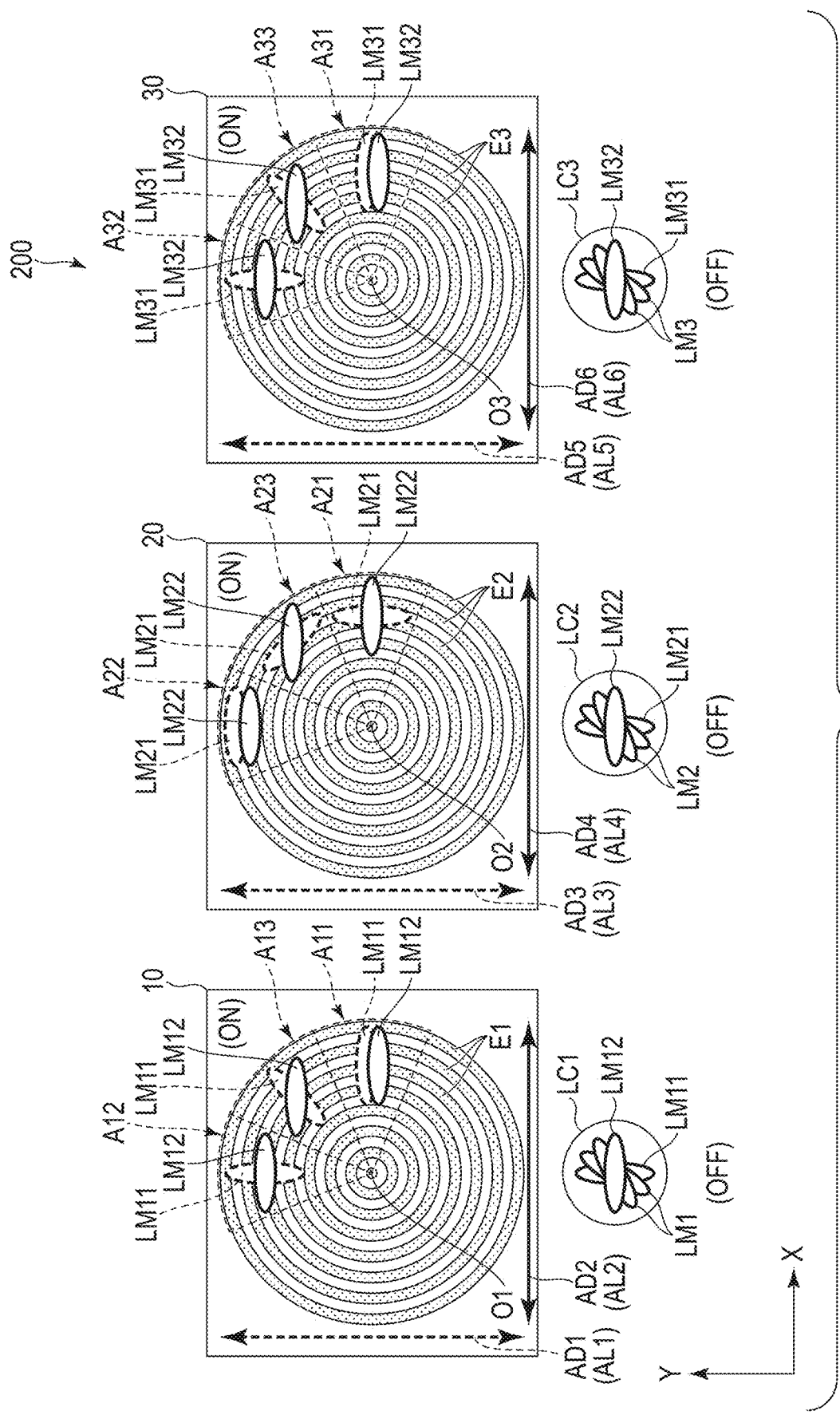
FIG. 9 is a view showing a second configuration example of the light control device 200.

FIG. 9 is a view showing a second configuration example of the light control device 200. The second configuration example shown in FIG. 9 is different from the first configuration example shown in FIG. 8 in configuration of the second liquid crystal cell 20. The configuration of the second liquid crystal cell 20 will be mainly described below.

In the second liquid crystal cell 20, the alignment treatment direction AD3 of the third alignment film AL3 is parallel to the second direction Y, and the alignment treatment direction AD4 of the fourth alignment film AL4 is parallel to the first direction X. In other words, the alignment treatment direction AD3 is orthogonal to the alignment treatment direction AD4, in the second liquid crystal cell 20. The second liquid crystal layer LC2 is a negative type with a negative dielectric anisotropy. In the OFF state, the liquid crystal molecules LM2 are twist-aligned at 90 degrees between the third alignment film AL3 and the fourth alignment film AL4. Among the liquid crystal molecules LM2, a liquid crystal molecule LM21 near the third alignment film AL3 is aligned along the second direction Y, a liquid crystal molecule LM22 near the fourth alignment film AL4 is aligned along the first direction X, and the plurality of liquid crystal molecules LM2 located in the intermediate layer are twist-aligned. The second liquid crystal cell 20 has an optical rotation ability to rotate a polarization plane of a polarization component (linearly polarized light) of the incident light at 90 degrees. For example, the second liquid crystal cell 20 converts the second polarization component of the incident light into the first polarization component.

The second liquid crystal cell 20 includes the area A21, the area A22, and the area A23, similarly to the first configuration example. When the first liquid crystal cell 10, the second liquid crystal cell 20, and the third liquid crystal cell 30 are stacked, the area A21 is located between the areas A11 and A31, the area A22 is located between the areas A12 and A32, and the area A23 is located between the areas A13 and A33. In each of the areas A21 to A23, the liquid crystal molecules LM2 in the OFF state are also all twist-aligned similarly.

The liquid crystal molecule LM21 in the ON state is represented by a dotted line in the figure, and the liquid crystal molecule LM22 in the ON state is represented by a solid line in the figure.

In the area A21, since the liquid crystal molecule LM21 is a negative type, it is aligned in the second direction Y to intersect the electric field. The liquid crystal molecules LM21 and LM22 are aligned to be substantially orthogonal to each other in planar view. In such an area A21, the second polarization component of the incident light which is the transmitted light of the area A11, is converted into the first polarization component.

In the area A22, the liquid crystal molecule LM21 is aligned in the first direction X to intersect the electric field. The liquid crystal molecules LM21 and LM22 are aligned substantially in parallel in planar view. In such an area A22, the first polarization component and the second polarization component of the incident light which is the transmitted light of the area A12, are transmitted.

In the area A23, an intermediate aligned state between the area A21 and the area A22 is formed. In other words, the liquid crystal molecules LM21 and LM22 are aligned to intersect but are not orthogonal to each other, in planar view.

According to such a second configuration example, the second polarization component that is hardly scattered, of the transmitted light of the area A11, is converted into the first polarization component, in the area A21 of the second liquid crystal cell 20, similarly to the above-described first configuration example. The first polarization component converted in the area A21 is scattered in the area A31. Therefore, both the first polarization component and the second polarization component of the light transmitted through the area A11, the area A21, and the area A31 of the light control device 200 are scattered.

The scattering efficiency can be thereby improved similarly to the first configuration example.

Third Configuration Example

Figure 10:
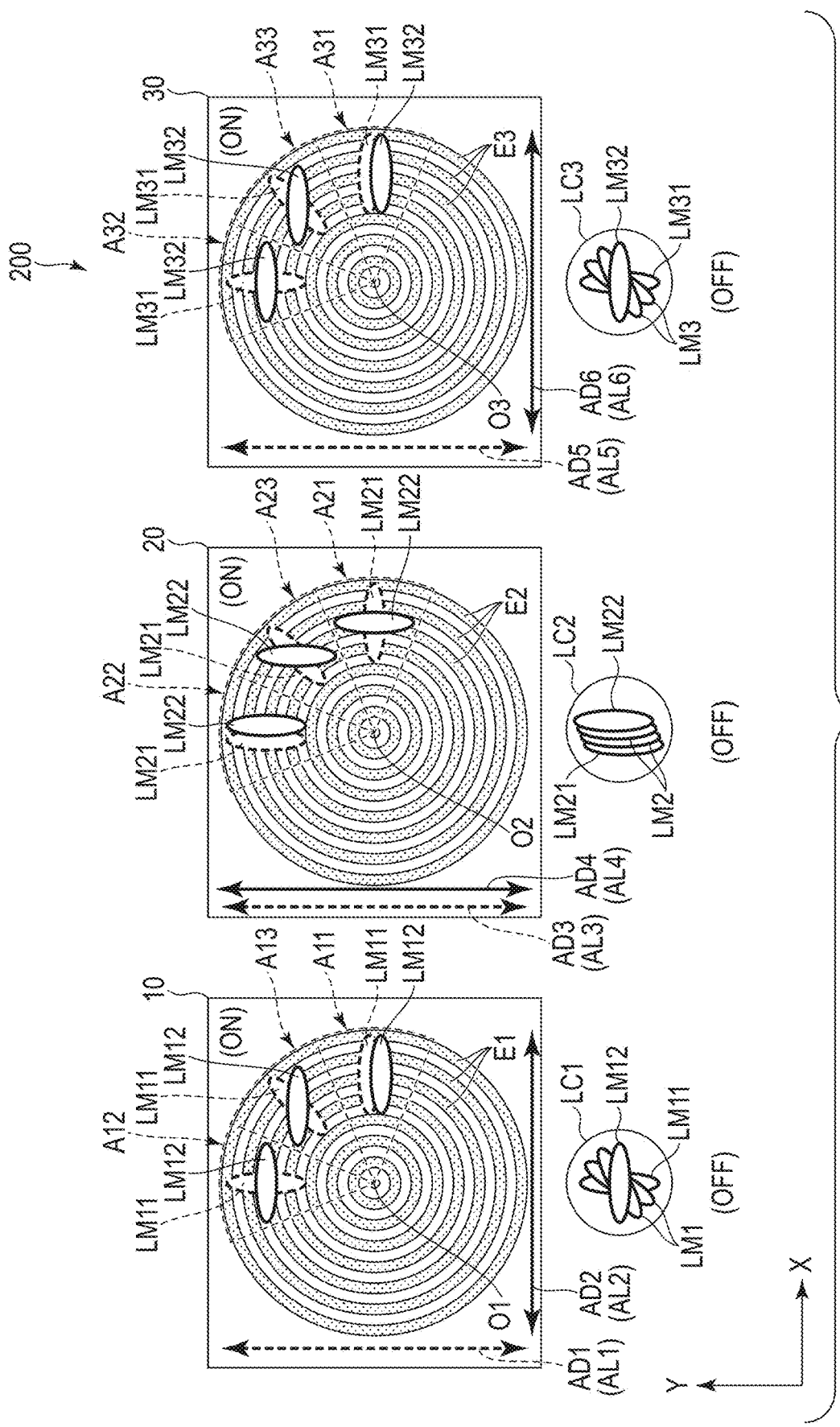
FIG. 10 is a view showing a third configuration example of the light control device 200.

FIG. 10 is a view showing a third configuration example of the light control device 200. The third configuration example shown in FIG. 10 is different from the first configuration example shown in FIG. 8 in configuration of the second liquid crystal cell 20. The configuration of the second liquid crystal cell 20 will be mainly described below.

In the second liquid crystal cell 20, the alignment treatment direction AD3 of the third alignment film AL3 and the alignment treatment direction AD4 of the fourth alignment film AL4 are parallel to the second direction Y. In other words, the alignment treatment direction AD3 is parallel to the alignment treatment direction AD4 in the second liquid crystal cell 20. The second liquid crystal layer LC2 is a positive type with a positive dielectric anisotropy. In the OFF state, the liquid crystal molecules LM2 are homogeneously aligned between the third alignment film AL3 and the fourth alignment film AL4. The liquid crystal molecules LM2 are initially aligned along the second direction Y. Among the liquid crystal molecules LM2, the liquid crystal molecule LM21 near the third alignment film AL3, the liquid crystal molecule LM22 near the fourth alignment film AL4, and the plurality of liquid crystal molecules LM2 located in the intermediate layer are all aligned in the second direction Y.

The second liquid crystal cell 20 includes the area A21, the area A22, and the area A23, similarly to the first configuration example. When the first liquid crystal cell 10, the second liquid crystal cell 20, and the third liquid crystal cell 30 are stacked, the area A21 is located between the areas A11 and A31, the area A22 is located between the areas A12 and A32, and the area A23 is located between the areas A13 and A33. In each of the areas A21 to A23, the liquid crystal molecules LM2 in the OFF state are all homogeneously aligned similarly.

The liquid crystal molecule LM21 in the ON state is represented by a dotted line in the figure, and the liquid crystal molecule LM22 in the ON state is represented by a solid line in the figure.

In the area A21, since the liquid crystal molecule LM21 is a positive type, it is aligned in the first direction X along the electric field. The liquid crystal molecules LM21 and LM22 are aligned to be substantially orthogonal to each other in planar view. In such an area A21, the second polarization component of the incident light which is the transmitted light of the area A11, is converted into the first polarization component.

In the area A22, the liquid crystal molecule LM21 is aligned in the second direction Y along the electric field. The liquid crystal molecules LM21 and LM22 are aligned substantially in parallel in planar view. In such an area A22, the first polarization component and the second polarization component of the incident light which is the transmitted light of the area A12, are transmitted.

In the area A23, an intermediate aligned state between the area A21 and the area A22 is formed. In other words, the liquid crystal molecules LM21 and LM22 are aligned to intersect but are not orthogonal to each other, in planar view.

According to such a third configuration example, the second polarization component that is hardly scattered, of the transmitted light of the area A11, is converted into the first polarization component, in the area A21 of the second liquid crystal cell 20, similarly to the above-described first configuration example. The first polarization component converted in the area A21 is scattered in the area A31. Therefore, both the first polarization component and the second polarization component of the light transmitted through the area A11, the area A21, and the area A31 of the light control device 200 are scattered.

The scattering efficiency can be thereby improved similarly to the first configuration example.

Fourth Configuration Example

Figure 11:
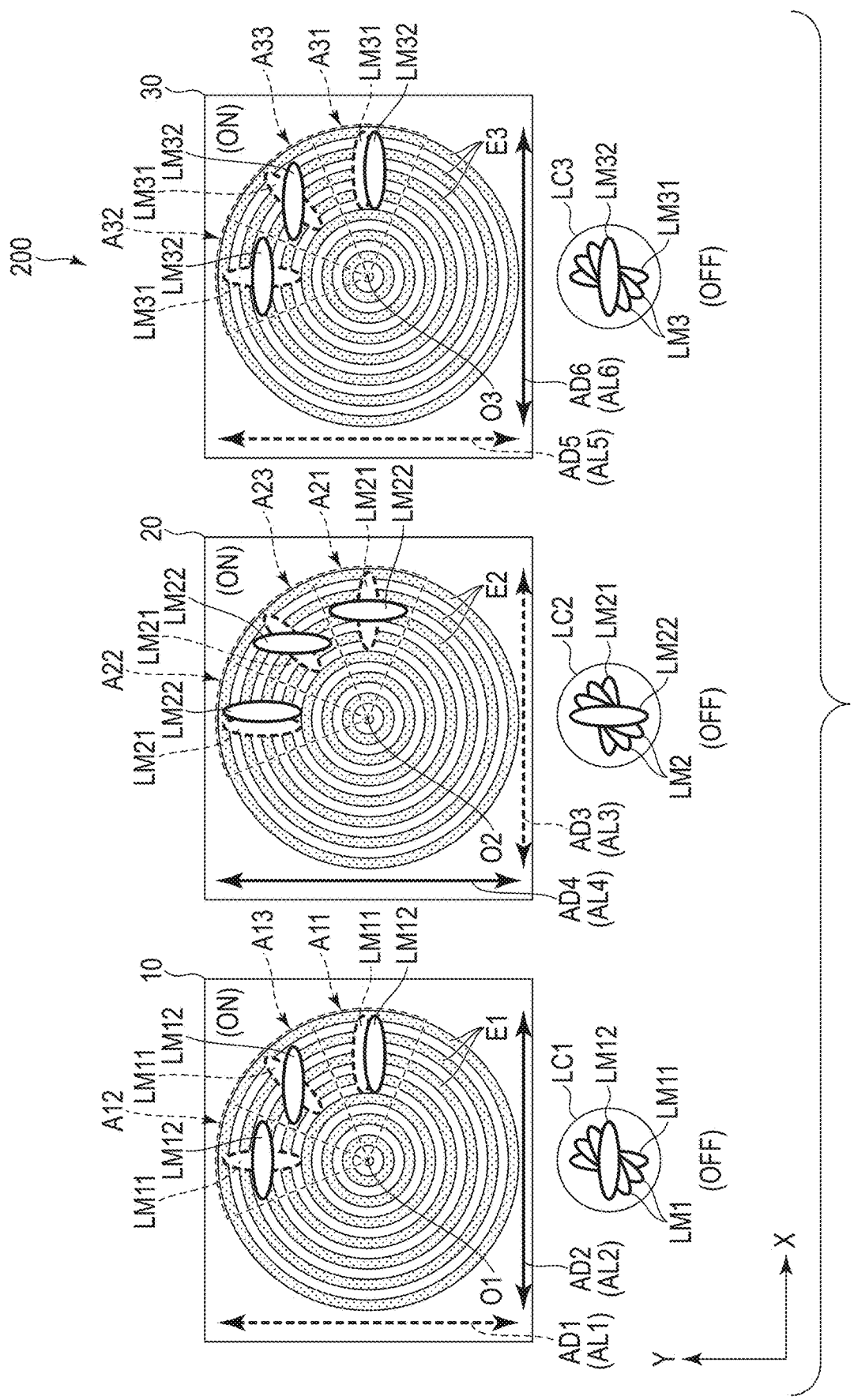
FIG. 11 is a view showing a fourth configuration example of the light control device 200.

FIG. 11 is a view showing a fourth configuration example of the light control device 200. The fourth configuration example shown in FIG. 11 is different from the first configuration example shown in FIG. 8 in configuration of the second liquid crystal cell 20. The configuration of the second liquid crystal cell 20 will be mainly described below.

In the second liquid crystal cell 20, the alignment treatment direction AD3 of the third alignment film AL3 is parallel to the first direction X, and the alignment treatment direction AD4 of the fourth alignment film AL4 is parallel to the second direction Y. In other words, the alignment treatment direction AD3 is orthogonal to the alignment treatment direction AD4, in the second liquid crystal cell 20. The second liquid crystal layer LC2 is a positive type with a positive dielectric anisotropy. In the OFF state, the liquid crystal molecules LM2 are twist-aligned at 90 degrees between the third alignment film AL3 and the fourth alignment film AL4. Among the liquid crystal molecules LM2, a liquid crystal molecule LM21 near the third alignment film AL3 is aligned along the first direction X, a liquid crystal molecule LM22 near the fourth alignment film AL4 is aligned along the second direction Y, and the plurality of liquid crystal molecules LM2 located in the intermediate layer are twist-aligned. The second liquid crystal cell 20 has an optical rotation ability to rotate a polarization plane of a polarization component (linearly polarized light) of the incident light at 90 degrees.

The second liquid crystal cell 20 includes the area A21, the area A22, and the area A23, similarly to the first configuration example. When the first liquid crystal cell 10, the second liquid crystal cell 20, and the third liquid crystal cell 30 are stacked, the area A21 is located between the areas A11 and A31, the area A22 is located between the areas A12 and A32, and the area A23 is located between the areas A13 and A33. In each of the areas A21 to A23, the liquid crystal molecules LM2 in the OFF state are also all twist-aligned similarly.

The liquid crystal molecule LM21 in the ON state is represented by a dotted line in the figure, and the liquid crystal molecule LM22 in the ON state is represented by a solid line in the figure.

In the area A21, since the liquid crystal molecule LM21 is a positive type, it is aligned in the first direction X along the electric field. The liquid crystal molecules LM21 and LM22 are aligned to be substantially orthogonal to each other in planar view. In such an area A21, the second polarization component of the incident light which is the transmitted light of the area A11, is converted into the first polarization component.

In the area A22, the liquid crystal molecule LM21 is aligned in the second direction Y along the electric field. The liquid crystal molecules LM21 and LM22 are aligned substantially in parallel in planar view. In such an area A22, the first polarization component and the second polarization component of the incident light which is the transmitted light of the area A12, are transmitted.

In the area A23, an intermediate aligned state between the area A21 and the area A22 is formed. In other words, the liquid crystal molecules LM21 and LM22 are aligned to intersect but are not orthogonal to each other, in planar view.

According to the fourth configuration example, the same advantages as those of the above-described third configuration example can be obtained.

As described above, according to the embodiments, a light control device and an illumination device capable of improving the scattering efficiency can be provided.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A light control device comprising:
   a first liquid crystal cell comprising a first substrate, a second substrate opposed to the first substrate, and a first liquid crystal layer held between the first substrate and the second substrate, the first substrate comprising a plurality of first electrodes disposed concentrically;
   a second liquid crystal cell comprising a third substrate, a fourth substrate opposed to the third substrate, and a second liquid crystal layer held between the third substrate and the fourth substrate, the third substrate comprising a plurality of second electrodes disposed concentrically and overlapping the second substrate; and
   a third liquid crystal cell comprising a fifth substrate, a sixth substrate opposed to the fifth substrate, and a third liquid crystal layer held between the fifth substrate and the sixth substrate, the fifth substrate comprising a plurality of third electrodes disposed concentrically and overlapping the fourth substrate, wherein each of the first liquid crystal layer and the third liquid crystal layer includes:

a first area where a first polarization component having a first polarization plane along a first direction, of incident light, is scattered and a second polarization component having a second polarization plane along a second direction intersecting the first direction, of the incident light, is transmitted; and a second area where the first polarization component of the incident light is converted into the second polarization component, and the second polarization component of the incident light is scattered, the second liquid crystal layer includes:

a third area which overlaps the first area and where the second polarization component of the incident light is converted into the first polarization component; and a fourth area which overlaps the second area.

2. The light control device of claim 1, wherein a center of the first electrode, a center of the second electrode, and a center of the third electrode overlap in planar view.

3. The light control device of claim 1, wherein each of the first liquid crystal layer and the third liquid crystal layer has a positive dielectric anisotropy and contains liquid crystal molecules twist-aligned in a state in which a voltage is not applied, and the second liquid crystal layer has a negative dielectric anisotropy and contains liquid crystal molecules homogeneously aligned in a state in which a voltage is not applied.

4. The light control device of claim 3, wherein
the first substrate comprises a first alignment film subjected to alignment treatment in the second direction,
the second substrate comprises a second alignment film subjected to alignment treatment in the first direction,
the third substrate comprises a third alignment film subjected to alignment treatment in the first direction,
the fourth substrate comprises a fourth alignment film subjected to alignment treatment in the first direction,
the fifth substrate comprises a fifth alignment film subjected to alignment treatment in the second direction, and
the sixth substrate comprises a sixth alignment film subjected to alignment treatment in the first direction.

5. The light control device of claim 1, wherein
each of the first liquid crystal layer and the third liquid crystal layer has a positive dielectric anisotropy and contains liquid crystal molecules twist-aligned in a state in which a voltage is not applied, and
the second liquid crystal layer has a negative dielectric anisotropy and contains liquid crystal molecules twist-aligned in a state in which a voltage is not applied.

6. The light control device of claim 5, wherein
the first substrate comprises a first alignment film subjected to alignment treatment in the second direction,
the second substrate comprises a second alignment film subjected to alignment treatment in the first direction,
the third substrate comprises a third alignment film subjected to alignment treatment in the second direction,
the fourth substrate comprises a fourth alignment film subjected to alignment treatment in the first direction,
the fifth substrate comprises a fifth alignment film subjected to alignment treatment in the second direction, and the sixth substrate comprises a sixth alignment film subjected to alignment treatment in the first direction.

7. The light control device of claim 1, wherein
each of the first liquid crystal layer and the third liquid crystal layer has a positive dielectric anisotropy and contains liquid crystal molecules twist-aligned in a state in which a voltage is not applied, and
the second liquid crystal layer has a positive dielectric anisotropy and contains liquid crystal molecules homogeneously aligned in a state in which a voltage is not applied.

8. The light control device of claim 7, wherein
the first substrate comprises a first alignment film subjected to alignment treatment in the second direction,
the second substrate comprises a second alignment film subjected to alignment treatment in the first direction,
the third substrate comprises a third alignment film subjected to alignment treatment in the second direction,
the fourth substrate comprises a fourth alignment film subjected to alignment treatment in the second direction,
the fifth substrate comprises a fifth alignment film subjected to alignment treatment in the second direction, and
the sixth substrate comprises a sixth alignment film subjected to alignment treatment in the first direction.

9. The light control device of claim 1, wherein
each of the first liquid crystal layer and the third liquid crystal layer has a positive dielectric anisotropy and contains liquid crystal molecules twist-aligned in a state in which a voltage is not applied, and
the second liquid crystal layer has a positive dielectric anisotropy and contains liquid crystal molecules twist-aligned in a state in which a voltage is not applied.

10. The light control device of claim 9, wherein
the first substrate comprises a first alignment film subjected to alignment treatment in the second direction,
the second substrate comprises a second alignment film subjected to alignment treatment in the first direction,
the third substrate comprises a third alignment film subjected to alignment treatment in the first direction,
the fourth substrate comprises a fourth alignment film subjected to alignment treatment in the second direction,
the fifth substrate comprises a fifth alignment film subjected to alignment treatment in the second direction, and
the sixth substrate comprises a sixth alignment film subjected to alignment treatment in the first direction.

11. An illumination device comprising:
a light source; and
the light control device of claim 1 configured to control light emitted from the light source.

12. A light control device comprising:
a first liquid crystal cell comprising a first substrate, a second substrate opposed to the first substrate, and a first liquid crystal layer held between the first substrate and the second substrate, the first substrate comprising a plurality of first electrodes disposed concentrically;
a second liquid crystal cell comprising a third substrate, a fourth substrate opposed to the third substrate, and a second liquid crystal layer held between the third substrate and the fourth substrate, the third substrate comprising a plurality of second electrodes disposed concentrically and overlapping the second substrate; and a third liquid crystal cell comprising a fifth substrate, a sixth substrate opposed to the fifth substrate, and a third liquid crystal layer held between the fifth substrate and the sixth substrate, the fifth substrate comprising a plurality of third electrodes disposed concentrically and overlapping the fourth substrate, wherein each of the first liquid crystal layer and the third liquid crystal layer has a positive dielectric anisotropy and contains liquid crystal molecules twist-aligned in a state in which a voltage is not applied, and the second liquid crystal layer has a negative dielectric anisotropy and contains liquid crystal molecules homogeneously aligned in a state in which a voltage is not applied.

13. The light control device of claim 12, wherein
the first substrate comprises a first alignment film subjected to alignment treatment in a second direction,
the second substrate comprises a second alignment film subjected to alignment treatment in a first direction intersecting the second direction,
the third substrate comprises a third alignment film subjected to alignment treatment in the first direction,
the fourth substrate comprises a fourth alignment film subjected to alignment treatment in the first direction,
the fifth substrate comprises a fifth alignment film subjected to alignment treatment in the second direction, and
the sixth substrate comprises a sixth alignment film subjected to alignment treatment in the first direction.

14. A light control device comprising:
a first liquid crystal cell comprising a first substrate, a second substrate opposed to the first substrate, and a first liquid crystal layer held between the first substrate and the second substrate, the first substrate comprising a plurality of first electrodes disposed concentrically;
a second liquid crystal cell comprising a third substrate, a fourth substrate opposed to the third substrate, and a second liquid crystal layer held between the third substrate and the fourth substrate, the third substrate comprising a plurality of second electrodes disposed concentrically and overlapping the second substrate; and
a third liquid crystal cell comprising a fifth substrate, a sixth substrate opposed to the fifth substrate, and a third liquid crystal layer held between the fifth substrate and the sixth substrate, the fifth substrate comprising a plurality of third electrodes disposed concentrically and overlapping the fourth substrate, wherein each of the first liquid crystal layer and the third liquid crystal layer has a positive dielectric anisotropy and contains liquid crystal molecules twist-aligned in a state in which a voltage is not applied, and the second liquid crystal layer has a negative dielectric anisotropy and contains liquid crystal molecules twist-aligned in a state in which a voltage is not applied.

15. The light control device of claim 14, wherein
the first substrate comprises a first alignment film subjected to alignment treatment in a second direction,
the second substrate comprises a second alignment film subjected to alignment treatment in a first direction intersecting the second direction,
the third substrate comprises a third alignment film subjected to alignment treatment in the second direction,
the fourth substrate comprises a fourth alignment film subjected to alignment treatment in the first direction,
the fifth substrate comprises a fifth alignment film subjected to alignment treatment in the second direction, and
the sixth substrate comprises a sixth alignment film subjected to alignment treatment in the first direction.

16. A light control device comprising:
a first liquid crystal cell comprising a first substrate, a second substrate opposed to the first substrate, and a first liquid crystal layer held between the first substrate and the second substrate, the first substrate comprising a plurality of first electrodes disposed concentrically;
a second liquid crystal cell comprising a third substrate, a fourth substrate opposed to the third substrate, and a second liquid crystal layer held between the third substrate and the fourth substrate, the third substrate comprising a plurality of second electrodes disposed concentrically and overlapping the second substrate; and
a third liquid crystal cell comprising a fifth substrate, a sixth substrate opposed to the fifth substrate, and a third liquid crystal layer held between the fifth substrate and the sixth substrate, the fifth substrate comprising a plurality of third electrodes disposed concentrically and overlaps the fourth substrate, wherein each of the first liquid crystal layer and the third liquid crystal layer has a positive dielectric anisotropy and contains liquid crystal molecules twist-aligned in a state in which a voltage is not applied, and the second liquid crystal layer has a positive dielectric anisotropy and containing liquid crystal molecules homogeneously aligned in a state in which a voltage is not applied.

17. The light control device of claim 16, wherein
the first substrate comprises a first alignment film subjected to alignment treatment in a second direction,
the second substrate comprises a second alignment film subjected to alignment treatment in a first direction intersecting the second direction,
the third substrate comprises a third alignment film subjected to alignment treatment in the second direction,
the fourth substrate comprises a fourth alignment film subjected to alignment treatment in the second direction,
the fifth substrate comprises a fifth alignment film subjected to alignment treatment in the second direction, and
the sixth substrate comprises a sixth alignment film subjected to alignment treatment in the first direction.

18. A light control device comprising:
a first liquid crystal cell comprising a first substrate, a second substrate opposed to the first substrate, and a first liquid crystal layer held between the first substrate and the second substrate, the first substrate comprising a plurality of first electrodes disposed concentrically;
a second liquid crystal cell comprising a third substrate, a fourth substrate opposed to the third substrate, and a second liquid crystal layer held between the third substrate and the fourth substrate, the third substrate comprising a plurality of second electrodes disposed concentrically and overlapping the second substrate; and
a third liquid crystal cell comprising a fifth substrate, a sixth substrate opposed to the fifth substrate, and a third liquid crystal layer held between the fifth substrate and the sixth substrate, the fifth substrate comprising a plurality of third electrodes disposed concentrically and overlapping the fourth substrate, wherein each of the first liquid crystal layer and the third liquid crystal layer has a positive dielectric anisotropy and contains liquid crystal molecules twist-aligned in a state in which a voltage is not applied, and the second liquid crystal layer has a positive dielectric anisotropy and contains liquid crystal molecules twist-aligned in a state in which a voltage is not applied.

19. The light control device of claim 18, wherein the first substrate comprises a first alignment film subjected to alignment treatment in a second direction, the second substrate comprises a second alignment film subjected to alignment treatment in a first direction intersecting the second direction, the third substrate comprises a third alignment film subjected to alignment treatment in the first direction, the fourth substrate comprises a fourth alignment film subjected to alignment treatment in the second direction, the fifth substrate comprises a fifth alignment film subjected to alignment treatment in the second direction, and the sixth substrate comprises a sixth alignment film subjected to alignment treatment in the first direction.

\* \* \* \* \*